United States Patent [19]

Rourke

[11] 4,315,051
[45] Feb. 9, 1982

[54] PROCESS FOR EXPANDING THERMOFORMABLE MATERIALS HAVING CLEAR SURFACES AND THE RESULTANT PRODUCTS

[76] Inventor: Rosemary Rourke, Webster Pl., Newtown, Conn. 06470

[21] Appl. No.: 115,336

[22] Filed: Jan. 25, 1980

[51] Int. Cl.³ .................... B32B 3/12; B29C 17/02
[52] U.S. Cl. .......................... 428/119; 264/164; 425/384; 425/445; 425/812; 428/116
[58] Field of Search ............. 264/41, 164; 425/407, 425/384, 812, 445; 428/119, 116

[56] References Cited

U.S. PATENT DOCUMENTS

| 3,765,810 | 10/1973 | Smarook | 264/164 X |
| 3,919,445 | 11/1975 | Smarook | 264/41 X |
| 3,919,446 | 11/1975 | Smarook | 264/164 X |
| 4,113,909 | 9/1978 | Beasley | 264/164 X |
| 4,264,293 | 4/1981 | Rourke | 425/407 |
| 4,269,586 | 5/1981 | Ronayne | 425/407 |

Primary Examiner—Philip Anderson

[57] ABSTRACT

A process for producing a clear surface on expanded thermoformable material is disclosed. A film layer of non bondable plastic material is disposed adjacent the clear plastic material to be expanded. After the expansion process the film layer is removed leaving a clear smooth surface.

10 Claims, 2 Drawing Figures

PROCESS FOR EXPANDING THERMOFORMABLE MATERIALS HAVING CLEAR SURFACES AND THE RESULTANT PRODUCTS

BACKGROUND OF THE INVENTION

This invention relates to a process for expanding thermoformable materials and products in general and more particularly, to a process which permits having a clear surface on one side of the expanded material. In a series of patents granted to Walter Smarook and including U.S. Pat. Nos. 3,765,810 and 3,919,446 there is disclosed a process and apparatus for expanding thermoformable material in which a sheet of thermoformable material is disposed between two platens having a plurality of vented openings on the working surface. The platens are heated to a temperature of at least 70° C. at which point the material becomes tacky and is bonded to the platen by hot tack adhesion. The platens are then moved apart expanding the material in such a manner that, at the locations of the vented openings voids are formed in the material. The process disclosed in these patents was limited to relatively small sizes of material. As defined in these patents, thermoformable means that the described material is solid at 25° C. but can be reshaped or reformed above some higher temperature. Also defined in these patents is a temperature "Ta" which means a temperature at which a thermoplastic material exhibits hot tack adhesion.

U.S. Pat. No. 4,113,909 granted to Donald R. Beasly and assigned to the Norfield Corporation describes the manner in which such a process can be supplied to the formation of large sheets, e.g., 5×10 feet sheets of material. Such material has found numerous uses of an architectural and structural nature. Expanded panels can be made having voids on both sides and also with one flat side of the other side containing voids. However, the nature of the process has been such that when making a smooth sided expanded panel the smooth surface has an opaque appearance. It has been found desirable to have a smooth sided expanded panel that has a clear and smooth surface. There is, of course, many applications for clear or transparent panel of this nature such as in skylights, green houses, curtain walls, domes and so on.

Thus, the desirability of being able to make an expanded panel with a clear side for use in various architectural applications becomes evident.

SUMMARY OF THE INVENTION

It is thus, the object of the present invention to form a expanded panel of the nature described above, having a clear smooth outer surface.

This object is achieved using a process of the type described above by disposing between a sheet of clear plastic to be expanded and the flat platen which contains no vented openings a thin sheet of polypropylene or the like. The process is then carried out, by heating the platens which in turn heat the thermo formable clear plastic material during which heating the polypropylene adheres to the platen and to the clear plastic material permitting expansion to take place. After expansion, the expanded sheet with the layer of polypropylene thereon is cooled whereafter the polypropylene layer is easily stripped from the expanded panel leaving a clear, transparent surface.

DETAILED DESCRIPTION OF THE INVENTION

Figure 1:
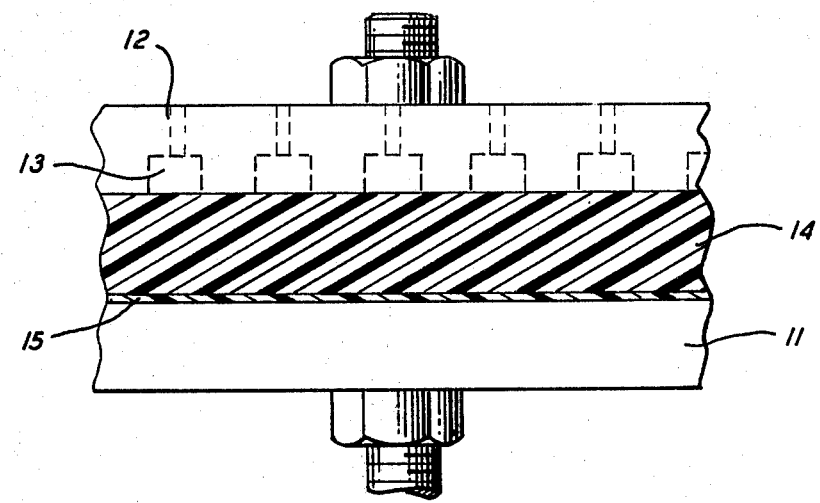
FIG. 1 is a partial cross section view across the platens and thermoformable material of the invention.
Figure 2:
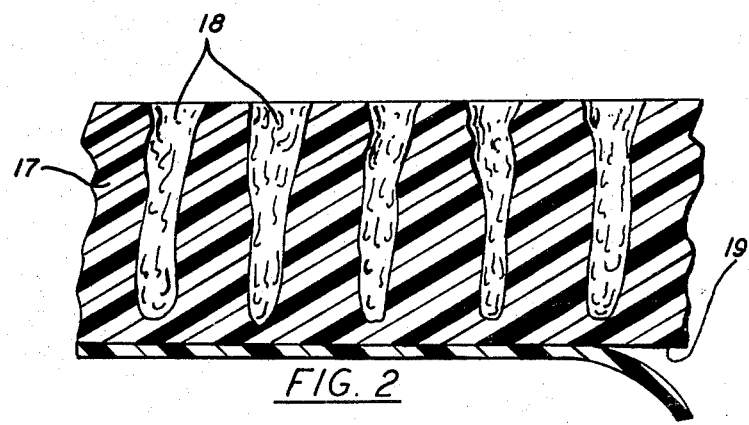
FIG. 2 is a partial cross section view of the expanded thermoformable material with the partially stripped non bonded layer.

In accordance with the present invention, FIG. 1 shows an apparatus of the type disclosed in the aforementioned U.S. Pat. No. 4,113,909, and which includes a flat platen 11 and a platen 12 containing a plurality of vented openings 13. A sheet of clear or transparent thermoformable material 14 with a film layer of polypropylene 15 or another material which does not bond such as low density polyethylene is disposed between the two platens. The film layer of non bondable materials 15 is of film thickness, i.e., 20 to 30 thousands of an inch and is disposed adjacent to the platen containing no vented openings. The transparent thermoformable material 14 may be for example, polyester, polycarbonates, crystal styrene, cellulose acetate butyrate or an acrylic. The platens are brought together against the material so disposed and heated to a temperature of, at least 70° C. When heating is completed, because of hot tack adhesion, the film layer 15 adheres to the flat platen 11 and to the clear thermoformable material 14, and the other side of the clear plastic material adheres to the vented platen. The two platens are then moved apart to carry out the desired expansion. When the platens are moved apart, the transparent thermoformable material adheres to the surface of the platen but not at the vented openings, resulting in the formation of voids within the body of the expanded material. Cooling then takes place and when the expanded structure is cooled it is removed from between the platens. The resulting product is an expanded panel of clear thermoformable material 17 with a plurality of exposed voids 18 on one side, and a substantially flat surface on the other, which has a film layer of material 15 which, because of the characteristic of the materials, has not bonded to the clear thermoformable material. Thereafter the polypropylene or other film layer 15 is stripped off as shown in FIG. 2, leaving a clear plastic surface 19 particularly useful for architectural purposes.

What is claimed is:

1. A method of forming an expanded panel of thermoformable material, in such a manner that said panel will have a flat smooth side comprising:
    disposing between a flat solid platen and a vented platen, a sheet of thermoformable material;
    placing between the sheet of thermoformable material and the flat solid platen a film layer of plastic material which does not bond to said thermoformable material but which exhibits hot tack adhesion at an elevated temperature;
    bringing the platens together so as to press against said sheet of thermoformable material and film layer;
    heating said platens to a temperature at which both the thermoformable material and the film layer exhibit hot tack adhesion;
    moving the platens apart so as to expand the thermoformable material into an expanded panel;
    cooling the expanded panel, removing the expanded panel from between the platens; and stripping the film layer from said expanded panel.

2. A method according to claim 1 wherein said thermoformable material is clear.

3. A method according to claim 1 wherein said film layer of material which will not bond is selected from the group consisting of polypropylene, and low density polyethylene.

4. A method according to claim 1 wherein said thermoformable material is selected from the group consisting of polyester, polycarbonate, crystal styrene, cellulose acetic butyrate, and acrylic.

5. A method according to claim 1 wherein said film has a thickness on the order of twenty to thirty thousands of an inch.

6. A method for forming an expanded panel of clear thermoformable material in such a manner that said panel will have a clear side comprising:

disposing a film layer of polypropylene on a sheet of clear thermoformable material;

disposing said film layer and said sheet between a platen with vented openings and a smooth platen, such that the film layer is in contact with the smooth platen;

moving the platens together so as to press against said sheet and said layer;

heating said platens to a temperature at which both the clear thermoformable material and the film layer of polypropylene exhibit hot tack adhesion;

separating the platens so as to expand the clear thermoformable material into an expanded panel;

cooling the expanded panel;

removing the expanded panel from between the platens; and stripping the film layer of polypropylene from said expanded panel.

7. A method according to claim 6 wherein said film layer of polypropylene has a thickness on the order of the 20-40 thousands of an inch.

8. An expanded panel of thermoformable material having a smooth side formed in accordance with the method claim 1.

9. An expanded panel of clear thermoformable material having a clear smooth side formed in accordance with the method of claim 2.

10. An expanded panel of clear thermoformable material having a clear smooth side formed in accordance with the method of claim 6.

* * * * *